United States Patent [19]

Imagawa

[11] Patent Number: 4,716,676
[45] Date of Patent: * Jan. 5, 1988

[54] INSECT KILLING SYSTEM

[76] Inventor: Masami Imagawa, c/o Sansyu Sangyo Kabushiki Kaisha, Minami-sakae, Kagoshima-shi, Kagoshima-ken, Japan

[*] Notice: The portion of the term of this patent subsequent to Nov. 4, 2003 has been disclaimed.

[21] Appl. No.: 846,908

[22] Filed: Mar. 31, 1986

Related U.S. Application Data

[63] Continuation-in-part of Ser. No. 647,030, Sep. 4, 1984, Pat. No. 4,620,388.

[51] Int. Cl.⁴ ............................................ A01M 19/00
[52] U.S. Cl. ......................................... 43/130; 422/26
[58] Field of Search ....................... 43/130, 129, 125; 422/26, 32, 305

[56] References Cited

U.S. PATENT DOCUMENTS

| 3,086,837 | 4/1963 | Wilkinson | 422/26 |
| 3,454,352 | 7/1969 | Lamboy | 422/26 |
| 3,897,818 | 8/1975 | Champel | 422/26 |
| 4,411,918 | 10/1983 | Cimino | 422/32 |
| 4,620,388 | 11/1986 | Imagawa | 43/130 |

FOREIGN PATENT DOCUMENTS

| 2710968 | 9/1977 | Fed. Rep. of Germany | 422/26 |
| 224951 | 12/1942 | Switzerland | 43/130 |
| 1341705 | 12/1973 | United Kingdom | 422/26 |

Primary Examiner—Gene P. Crosby
Attorney, Agent, or Firm—Oldham, Oldham & Weber Co.

[57] ABSTRACT

An insect killing system is disclosed which comprises a circulation chamber within which steam is allowed to flow and circulate and a differential insect killing cell which forces the steam within the circulation chamber to flow therethrough. In this insect killing system, by guiding the steam in the circulation chamber maintained at a preselected temperature and humidity into the differential insect killing cell, the product temperature or fruit core temperature of raw fruit can be maintained at a desired level so as to kill out the maggots and eggs of insect pests such as orange flies and melon flies attaching to the raw fruit contained within the differential insect killing cell.

8 Claims, 7 Drawing Figures

INSECT KILLING SYSTEM

This application is a continuation-in-part of application Ser. No. 647,030 filed Sept. 4, 1984 now U.S. Pat. No. 4,620,388.

BACKGROUND OF THE INVENTION

1. Field of the Invention

The present invention relates to an insect killing system used for killing insect pests such as orange files (*strumeta dorsalis*) and melon flies (*aulacophora femoralis*) which stick to raw fruit such as papayas, mangos, green peppers or the like.

2. Description of the Prior Art

It has been conventionally known that maggots or eggs of insect pests such as orange flies or melon flies sticking to papayas, mangos or the like could be killed out by means of a steaming treatment (under the operating conditions of; temperatures within a killing system of 43°–49° C.; fruit core (product) temperatures of 41°–41.7° C.; a humidity of 90%–100%; and, a treatment time of 3 hours.). Such treatment, however, has not been put to practical use so far, because it requres a high accuracy for the temperature and humidity conditions. In other words, in case of small-scale or experimental steaming treatment, the above-mentioned temperature and humidity conditions can be maintained constant for the treatment hours, but it has been found difficult to steam treat raw fruit on a larage sscale. For example, in case where the raw fruit is containted in a harvest box, it is difficult to satisfy the above-mentioned preselected temperature and humidity conditions for the raw fruit which is located in the center of the harvest box, and thus it is not possible to kill out the maggots and eggs of the orange flies attaching to all of the raw fruit.

SUMMARY OF THE INVENTION

Accordingly, it is a primary object of the invention to provide a system which is capable of steam treating on a large scale the raw fruit such as mangos to whcih the maggots and eggs of range flies and melon flies are attaching to kill out these maggots and eggs completely.

In brief, this object can be attained by providing an insect killing system comprising a circulation chamber for circulating and flowing steam therein and a differential insect killing cell for forcibly flowing the steam within the circulation chamber, in which the product temperature of raw fruit to be treated can be maintained at a preselected level by flowing the steam within the circulation chamber maintained at preselected temperature and humidity into the the differential insect killing cell to kill out the maggots and eggs of orange flies and melon flies attaching to the raw fruit contained in the differential insect killing cell. Further, an air blower is provided to facsilitate the flow of the steam within the circulation chamber into the differential insect killing cell.

It is another object of the invention to provide an insect killing system which is imple in structure.

In accomplishing this object, according to the invention, the differential insect killing cell to be provided in the circulation chamber is constructed to comprise a cover member formed of a flexible and non-air-permeable (impermeable) material such as a vinyl chloride sheet for covering the outer peripheral surfaces of piled-up harvest boxes containing the raw fruit therein, and a hood equipped with a differential fan on its topsurface. Thus, when the differential fan is operated, then the cover member is attracted to the side walls of the harvest boxes to form the differential insect killing cell. As a result of this, the steam within the circulation chamber is sucked from the bottom portions of the harvest boxes into the differential insect killing cell and is then discharged from the top portion thereof via the hood into the circulation chamber.

It is still another object of the invention to provide an insect killing system in which steam of preselected temperature and humidity can be supplied throughout the circulation chamber.

To achieve this object, according to the invention, there are provided a first air blower for air feeding on one of the side walls of the circulation chamber and a second air blower for air suction on the othere side wall thereof, and also there is provided between these two air blowers a circulation duct which contains a steam generator, a heating device, a cooling device and the like, thereby permitting the seam to circulate and flow within the circulation chamber. In this context, the circulation of the steam may be effected in either of the following directions: (a) a direction from the upper side of the circulation chamber down to the bottom side thereof, or (b) a direction from the bottom side of the circulation chamber up to the upper side thereof.

Upon further study of the specification and appended claims, further objects, features and advantages of the present invention will become more fully apparent to those skilled in the art to whcih the invention pertains.

BRIEF DESCRIPTION OF THE DRAWINGS

In the drawings, like reference characters and numerals repesent like or corresponding components throughout the drawings.

DETAILED DESCRIPTION OF A PREFERRED EMBODIMENT OF TEH INVENTION

Figure 1:
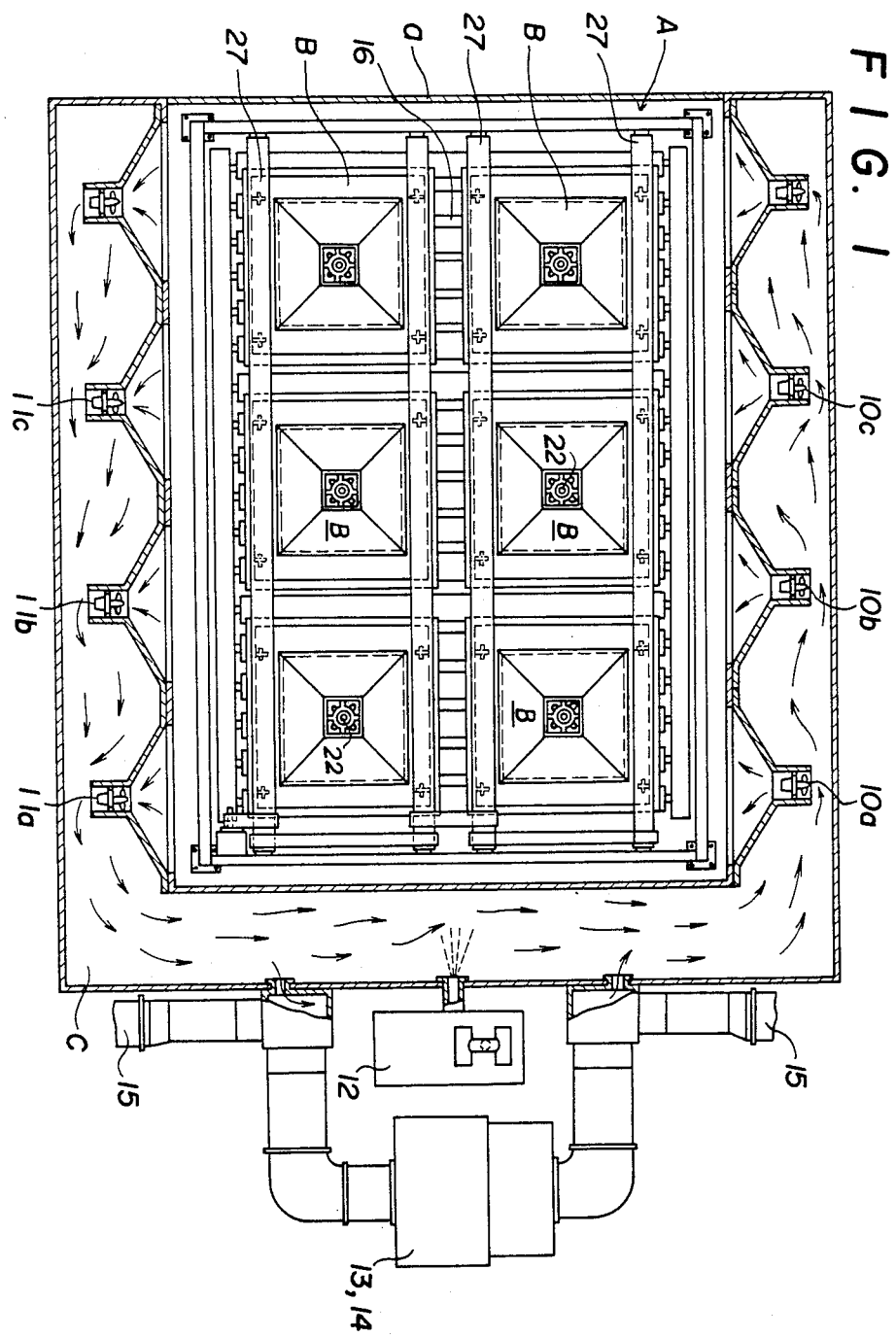
FIG. 1 is a partially cutaway plan view of an embodiment of the invention.
Figure 2:
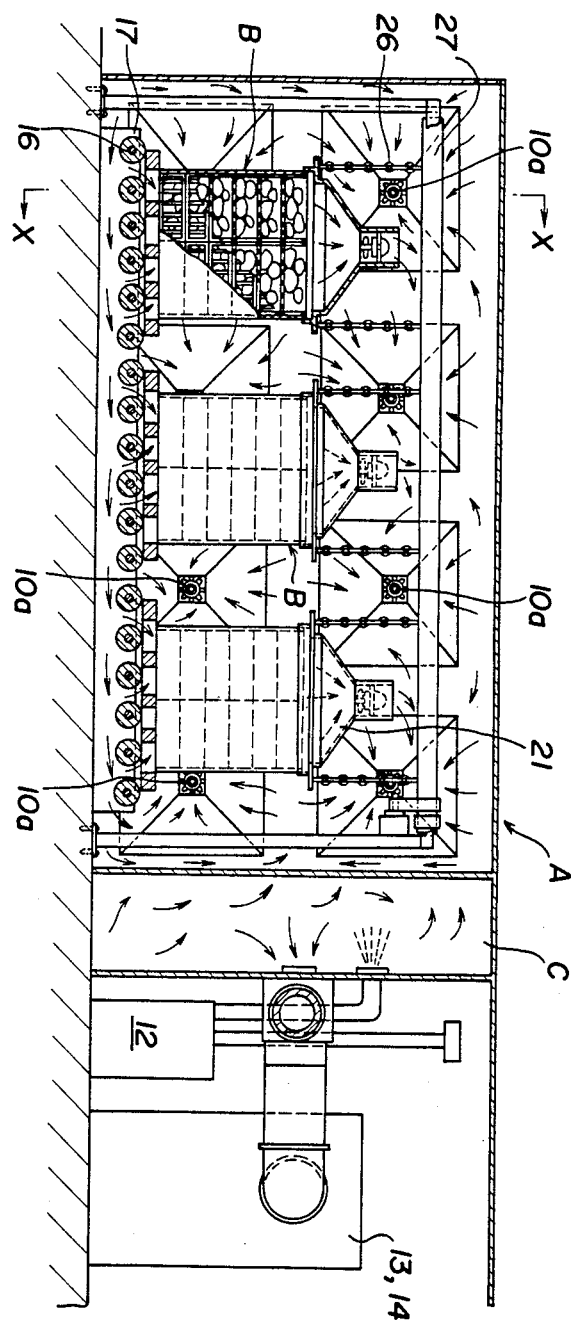
FIG. 2 is a longitudinal side sectional view of the same.
Figure 3:
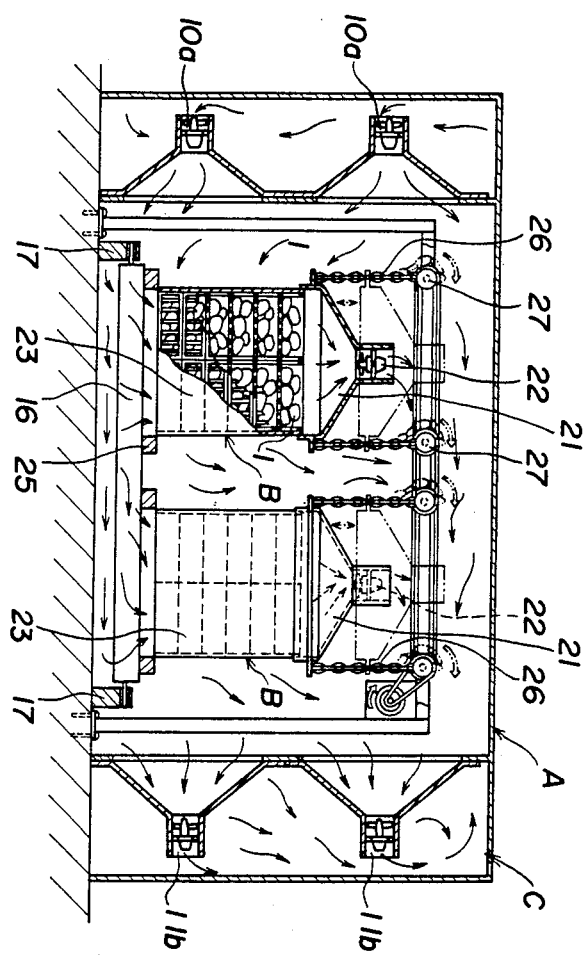
FIG. 3 is a longitudinal sectional veiw taken along the line X—X in FIG. 2.

FIGS. 1–3 illustrate an insect killing system of the invention. In the drawings, reference character (A) stands for a circulation chamber, and characters (B)(B)—denote differential insect killing cells provided within the circulation chamber (A) respectively.

The circulation chamber (A) is provided on its opposed side walls with air blowers (10a), (10b), (10c), (11a), (11b), (11c) so that steam is allowed to flow in a horizontal direction (that is, transverse direction) within the circulation chamber (A). In the drawings, character (C) designates a circulation duct which serves to feed a preselected steam into the circulation chamber (A). This circulation duct (C) is equipped with a steam generator (12), a heating device (13), a cooling device (14), discharge ports (15)(15) and the like necessary to maintain the temperature and humidity inside the circulation chamber (A) at preselected levels respectively. These facilities are automatically operated or stopped in accordance with a sensor provided in the circulation chamber (A).

The circulation chamber (A) is provided on its floor surface with roller conveyors (16)(17) to facilitate operations for taking in and out the raw fruit such as green pepper (1) loaded on board a pallet (25). There is a space between the roller (16)(17) and the floor surface of the circulation chamber (A) underlying these roller conveyors (16)(17), through which space the steam contained within the circulation chamber (A) is sucked into the differential insect killing cells (B)(B)—. In the drawings, (a1) represents a door for opening or closing the circulation chamber (A).

Figure 4:
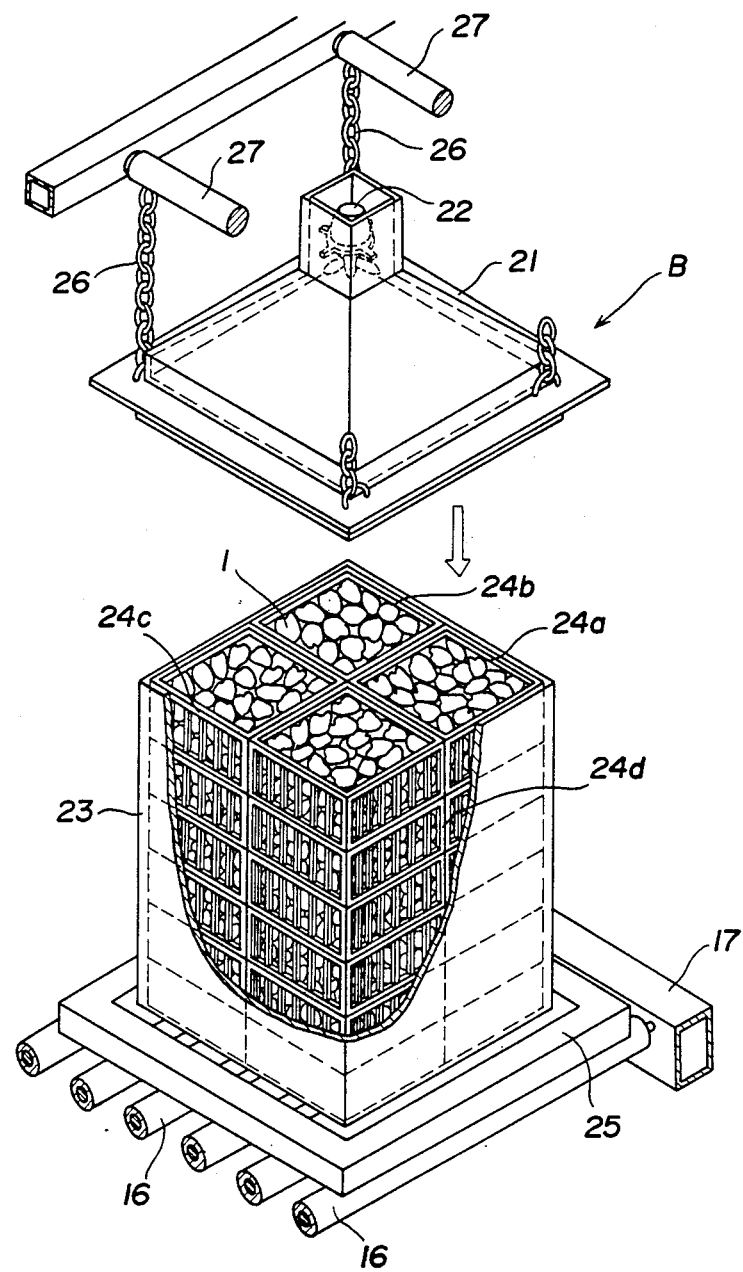
FIG. 4 is an exploded perspective view of a differential insect killing cell employed in the invention.

Now, FIG. 4 illustrates an example of the differential insect killing cells (B)(B)—employed in the invention. It comprises a hood (21) adapted to be moved vertically by winding means (26)(27), a differential fan (22) mounted onto the top portion of the hood (21), and a cover member (23) for covering the outer peripheral surfaces of harvest boxes (24a) (24b) (24c) (24d)—which contain the green peppers (1) therein and are carried on a pallet (25). The differential fan (22) is a variable air blower which can be adjusted in number of revolution in accordance wtih amounts of the green peppers contained in the haravest boxes (24a)—, the actual states of the contained green peppers and the like. When the differential fan (22) is operated, the steam contained in the bottom portion of the circulation chamber (A) is sucked through clearances between the roller conveyors (16)(17) and the pallet (25) into the differential insect killing cell (B), and is then blown via the hood (21) into the upper portions of the circulation chamber (A). Thus, this differential fan (22) can be used to maintain the product temperature of the green peppers (1) contained in the differential insect killing cell (B) at a predetermined level.

The cover member (23) forming a component of the above-mentioned differential insect killing cell (B) is formed of a flexible and air-impermeable material such as a vinyl chloride sheet or film and also serves to cover the outside peripheral surfaces of the harvest boxes (24a) (24b)—containing the green peppers (1), which harvest boxes have been piled up on one another, side by side and back and forth on the pallet (25). This cover member (23) is attracted to the outside peripheral surfaces of the harvest boxes (24a) (24b)—due to the force of attraction produced by operation of the differential fan (22). Each of the harvest boxes (24a) (24b)—has an open top surface and is also formed with a large number of ventilating holes in its side walls and bottom plate.

In other words, the green peppers that have been harvested in teh fields and packed into the harvest boxes (24a)—are carried on board the pallet (25), forwarded to the circulation chamber (A), and fed on board the roller conveyor (16) into a location just below the hood (21) that is a component of the differential insect killing cell (B). Next, the outer peripheral surfaces of the harvest boxes (24a)—on board the pallet (25) are covered up by the cover member (23), and the hood (21) is then moved down to cover the open upper surfaces of the harvest boxes (24a) (24b)—. Thereafter, the circulation chamber (A) is closed and the steam generator (12) and heating device (13) equipped in the circulation duct (C), the air blowers (10a)—, (11a)—, and the differential fan (22) of the differential insect killing cell (B) are operated. Consequently, a steram of circulation air is allowed to flow in a transverse (horizontal) direction within the circulation chamber (A) so as to maintian the temperature and humidity within the circulation chamber (A) at the preselected levels.

Then, since the cover member (23) provided around the outside peripheral surfaces of the harvest boxes (24a)—is caused to stick fast to these outside peripheral surfaces of the harvest boxes (24a)—due to the operation of the differential fan (22) and thus to close the ventilating holes on the outside surface side of the harvest boxes (24a)—, the steam contained within the circulation chamber (A) is sucked into the differential insect killing celll (B) from bottom, is passed through the green peppers (1) in the harvest boxes (24a)—, is blown from the upper portion of the differential insect killing cell (B) into the circulation chamber (A), and is spread around within the circulation chamber (A). In this way, the product temperature or fruit core temperature of the green peppers (1) within the differential insect killing cell (B) can be maintained at a preselected level.

If the above-mentioned operation is carried out 3 hours or so continuously, then the maggots and eggs of the orange flies and melon flies attaching to the green peppers (1) in each of the harvest boxes (24a)—can be killed out completely.

It should be noted that the above-mentioned steam treatment for dilling the insect pests sticking to the green peppers (1) can be accomplished effectively without shrinking the green peppers (1) themselves or impairing their complexion and elasticity.

Figure 5:
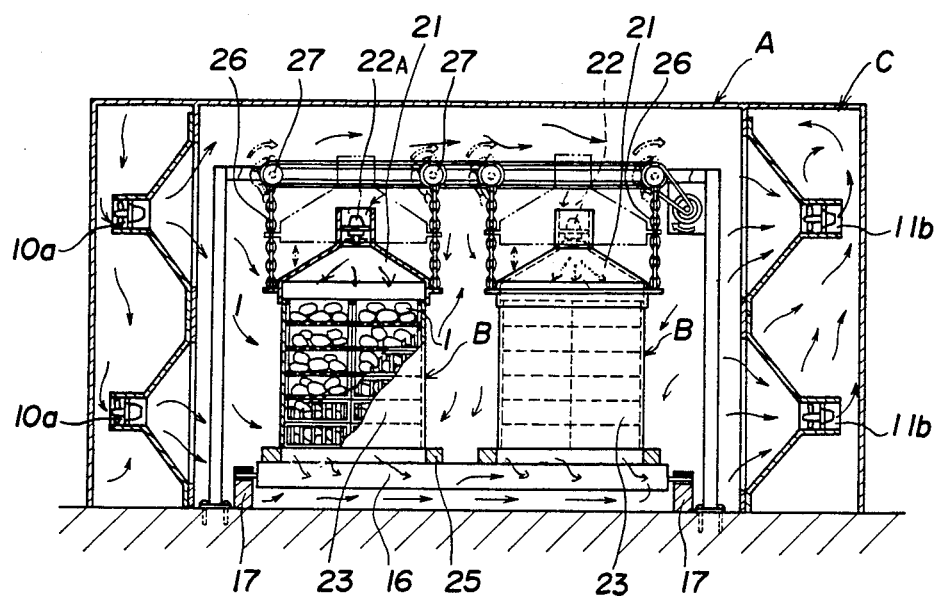
FIG. 5 is a sectional veiw of a second embodiment of the invention in which the steam is forced to flow downwardly through the differential insect killing cells.

Referring now to FIG. 5, there is shown a second embodiment of the invention, wherein like designations in the above-mentioned first embodiment of the invention denote like parts thereof. In this embodiment, the steam within the differential insect killing cells (B) is flowed in a direction from the upper side of the cells down to the bottom thereof. Therefore, a plurality of differential blowers (22A) are arranged such that they suck in the steam present in the upper portion of the circulation chamber (A) and blow the steam into the insect killing cells (B). Thus, as in the above-mentioned embodiment, the steam is allowed to flow in a horizontal direction with the circulation chamber (A) and the steam within the insect killing cells (B) is allowed to flow in a direction from the upper side of the cells down to the bottom side thereof so as to kill out the orange flies and melon flies attached to the raw fruits such as the green pepper (1) stored within the differential insect killing cells (B).

Figure 6:
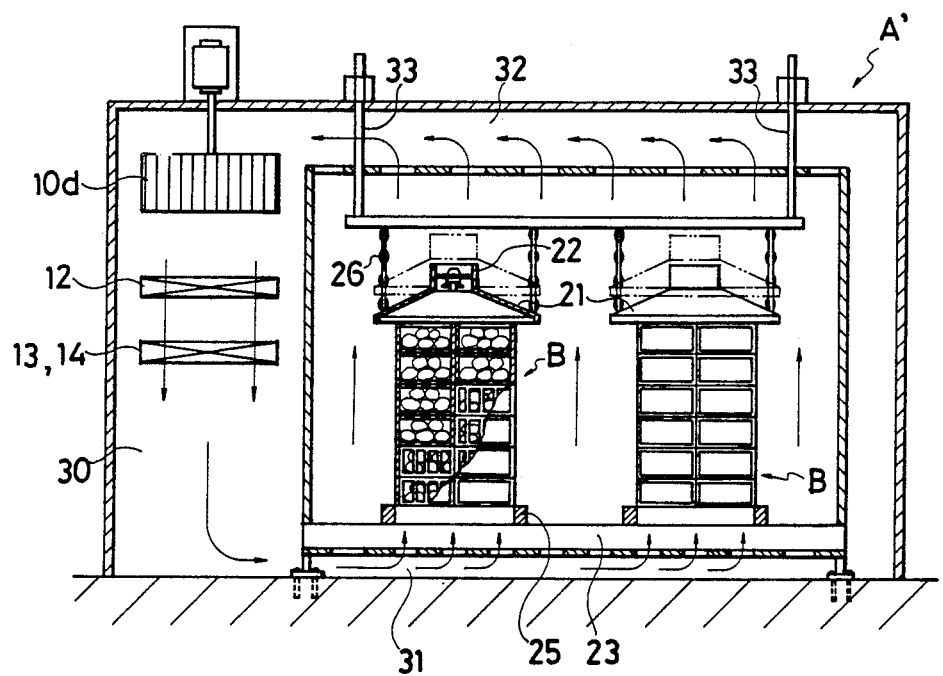
FIG. 6 is a partial sectional veiw of a third embodiment of the invention in which the steam is caused to flow upwardly within the circulation chamber.

In FIG. 6, there is illustrated a third embodiment of the invention in whcih the steam both within a circulation chamber (A') and differential insect killing cells (B) is flowed in the same direction. However, the amount of flow of the steam within the insect killing cells (B) is greater than that of the steam within the circulation chamber (A'), because the steam within the circulation chamber (A') is sucked into the insect killing cells (B) by means of the differential blowers (22) provided in the insect killing cells (B). In FIG. 6, like designations in the above-described embodiments denote like parts thereof. Within the circulation chamber (A'), there are provided two circulation passages (31)(32) respectively located in the upper and lower portions thereof, which passages are interconnected by means of a connecting cell (30). In this connecting cell (30) there are provided a blower for air feeding (10d), a steam generator (12), a heating device (13) and a cooling device (14). Thus, the steam within the circulation chamber (A') is allowed to circulate in the direction of arrows shown in FIG. 6. In this figure, numerals (33)(33) respectively designate lifting means for lifting and lowering hoods (21)(21) in a vertical direction.

Figure 7:
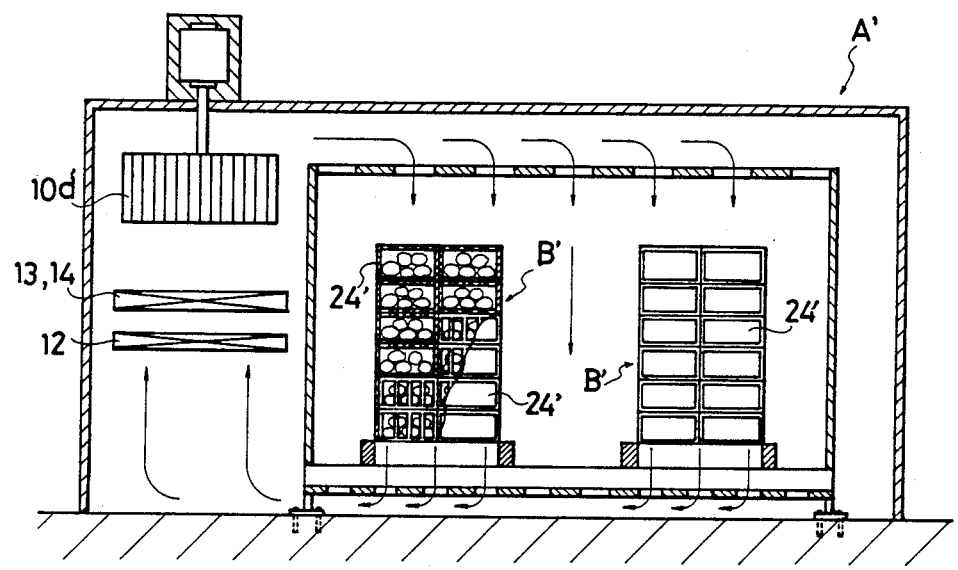
FIG. 7 is a partial sectional view of a fourth embodiment of the invention in which the steam is caused to flow downwardly within the circulation chamber.

Referring now to FIG. 7, there is shown a fourth embodiment of the invention. In this emobdiment, a plurality of differential insect killing cells (B') are provided within the same circulation chamber (A') as in the above-described third embodiment to kill out the insect pests, and within both the circulation chamber (A') and insect killing cells (B') the steam is allowed to flow in a direction from the upper side thereof down to the bottom side thereof. The circulation chamber (A') is constructed substantially in the same manner as in the above-described third embodiment except that a blower for air feeding (10d') is adapted to feed the steam in the opposite direction as in the third embodiment. However, each of the insect killing cells (B') is constructed by piling up a large number of harvest boxes (24') on another in both vertical and horizontal directions. Each of the harvest boxes (24') is open in the upper top portion thereof, is formed with a vent hole in the bottom thereof, and is closed in the four peripheral side surfaces thereof.

As has been discussed hereinbefore, the present invention comprises a circulation chamber in whcih steam is allowed to circulate and flow therein, and a differential insect killing cell which forces the steam within the circulation chamber to flow therethrough, and is charcterized in that after raw fruit to which insect pests such as orange flies and melon flies are attaching is stored within the differential insect killing cell, the steam is used to kill out these insect pests. Therefore, according to the invention, the steam can be fed around the raw fruit evenly and thus the porduct temperature of the raw fruit can be maintained at a predetermined level. In other words, since the product temperature of the raw fruit can be accurately maintained at a desired temperature for killing insect pests, the insect pests such as the orange and melon flies attaching to the raw fruit can be killed out completely without impairing the quality of the raw fruit.

What is claimed is:

1. An insect killing system for killing insect pests such as orange flies and melon flies, comprising:
    a circulation chamber in which steam is allowed to circulate;
    a plurality of differential insect killing cells with each cell having an open upper top portion and an open bottom portion, and wherein said differential insect killing cell comprises a hood adapted to be moved vertically by winding means, and a differential fan disposed in an upper opening of said hood, and a cover member for covering the outer sidewalls of a plurality of harvest boxes each of which is open on its top surface side, is formed with a vent hole in the bottom thereof, and is further formed in the sidewalls thereof with a large number of ventilating holes, in which said steam is forced to flow therethrough, said plurality of differential insect killing cells accomodating a large number of raw fruits with said inscet pest attached thereto and being arranged within said circulation chamber;
    first blower means for circulating said steam in said circulating chamber; and
    second blower means for forcing said steam to flow through each of said plurality of differential insect killing cells,
    whereby said steam is applied to each of said raw fruits and kills out said insect pests attached to said raw fruits, 2. The insect killing system according to claim 1, wherein said cover member is formed of a flexible and impermeable material such as a vinyl chloride sheet or film.

3. An insect killing system for killing insect pests such as orange flies and melon flies, comprising:
    a circulation chamber in which steam is allowed to circulate;
    a plurality of differential insect killing cells with each cell having an open upper top portion and an open bottom portion, said plurality of differential insect killing cells accomodating a large number of raw fruits with said inscet pests attached thereto and being arranged within said ciruclation chamber;
    first blower means for flowing and circulating said steam in a transverse direction within said circulation chamber, said first blower means comprising a plurality of blowers, or air feeding provided on one lateral wall of said circulation chamber and a plurality of blowers for air suction provided on the other opposed lateral wall thereof.
    second blower means for forcing said steam to flow through each of said plurality of differential insect killing cells in a direction from the upper side of said cell down to the bottom thereof,
    whereby said steam is applied to each of said raw fruits and kills out said insect pests attached to said raw fruits.

4. The insect killing system according to claim 3, wherein said second blower means comprises a hood with a fan disposed threin, wherein said differential insect killing cell comprises a hood adapted to be moved vertically by lifting means, a differential fan disposed in an upper opening of said hood, and a cover member for covering the other side walls of a plurality of harvest boxes each of which is open on its top surface side, is formed with a vent hole in the bottom thereof, and is closed in the peripheral side walls thereof, and wherein a circulation duct is provided outside of said circulation chamber, said circulation duct being equipped with a steam generator, a heating device, a cooling device and discharge ports.

5. An Insect killing system for killing insect pests such as orange flies and melon flies, comprising:
    a circulation chamber in which steam is allowed circulate;
    a plurality of differential insect killing cells with each cell having an open upper top portion and an open botom portion, said plurality of differential insect killing cells accomodating a large number of raw fruits with said insect pests attached thereto and being arranged within said circulation chamber;
    first blower means for flowing and circulating said steam within said circulation chamber in a direction from the bottom side of said circulation chamber up to the upper side thereof;
    second blower means for forcing said steam to flow through each of said plurality of differential insect killing cells in a direction indentical to that of steam being flowed by said first blower means, whereby said steam is applied to each of said raw fruits and kills out said isnect pests attached to sadi raw fruits.

6. The insect killing system according to claim 5, wherein said second blower means comprises a hood with a fan disposed therein, wherein said differential insect killing cell comprises a hood adapted to be moved vertically by lifting means, a differential fan disposed in an upper opening of said hood, and a cover member for covering the peripheral side walls of each of a plurlity of harvest boxes each of which is open on its top surface side, is formed with a vent hole in the bottom thereof, and is closed in the peripheral side walls thereof, and wherein a circulation duct is provided outside of said circulation chamber, said circulation duct being equipped with a steam generator, a heating device, a cooling device and discharge ports.

7. An insect killing system for killing insect pests such as orange flies and melon flies, comprising:
 a circulation chamber in which steam is allowed to circulate;
 a plurality of differential insect killing cells with each cell having an open upper top portion and an open bottom portion, said plurality of differential insect killing cells accomodating a large number of raw fruits with said insect pests attached thereto and being arranged within said circulation chamber;
 blower means for flowing and circulating said steam within said ciruclation chamber in a direction from the upper side of said circulation chamber down to the bottom side thereof,
 whereby said steam is flowed through each of said plurality of differential insect killing cells and applied to each of said raw fruits, thereby killing out said insect pests attached to sadi raw fruits.

8. The insect killing system according to claim 7, wherein said differential insect killing cell comprises a cover member for covering the peripheral side walls of each of a plurality of harvest boxes each of which is open on its top surface side, formed with a vent hole in the bottom thereof, and is closed in the peripheral side walls thereof.

* * * * *